(12) United States Patent
Casiraghi

(10) Patent No.: US 7,898,302 B1
(45) Date of Patent: Mar. 1, 2011

(54) COMPACT INTEGRATED CIRCUIT SOLUTIONS FOR DRIVING LIQUID LENSES IN AUTOFOCUS APPLICATIONS

(75) Inventor: Roberto Casiraghi, Milan (IT)

(73) Assignee: Maxim Integrated Products, Inc., Sunnyvale, CA (US)

( * ) Notice: Subject to any disclaimer, the term of this patent is extended or adjusted under 35 U.S.C. 154(b) by 53 days.

(21) Appl. No.: 12/263,058

(22) Filed: Oct. 31, 2008

(51) Int. Cl.
*H03B 1/00* (2006.01)
*H03K 3/00* (2006.01)

(52) U.S. Cl. .............................................. 327/108
(58) Field of Classification Search .................. 327/108
See application file for complete search history.

(56) References Cited

U.S. PATENT DOCUMENTS

| 4,642,490 | A | * | 2/1987 | Lawton | 327/116 |
| 6,710,773 | B2 | | 3/2004 | Jenkins et al. | |
| 2009/0110384 | A1 | * | 4/2009 | Lynch et al. | 396/133 |
| 2009/0140795 | A1 | * | 6/2009 | Choy | 327/536 |

OTHER PUBLICATIONS

"DrivIC 60 Series, DrivIC 60 LL3", *Rogers Corporation, Durel Division*, www.varioptic.com.

* cited by examiner

*Primary Examiner* — Lincoln Donovan
*Assistant Examiner* — Daniel Rojas
(74) *Attorney, Agent, or Firm* — Blakely Sokoloff Taylor & Zafman LLP

(57) ABSTRACT

Compact integrated circuit solutions for driving liquid lenses in autofocus applications. The invention uses a charge pump topology to produce high voltage, and needs only a low voltage external capacitor. No high voltage capacitor or inductor or transformer is used to provide the required high voltage or for smoothing the same.

17 Claims, 6 Drawing Sheets

COMPACT INTEGRATED CIRCUIT SOLUTIONS FOR DRIVING LIQUID LENSES IN AUTOFOCUS APPLICATIONS

BACKGROUND OF THE INVENTION

1. Field of the Invention

The present invention relates to the field of liquid lens autofocus control.

2. Prior Art

Liquid lenses are a rather new development, and are expected to find wide application in consumer products, particularly low cost products such as cell phone cameras and the like because of their low cost, lack of moving parts, durability and electrical focus control. They do, however, require a controllable operating voltage of up to tens of volts for focus control. Such a controllable high voltage is generally not available in typical products that might use a liquid lens, particularly battery powered devices.

DETAILED DESCRIPTION OF THE PREFERRED EMBODIMENTS

Figure 1:
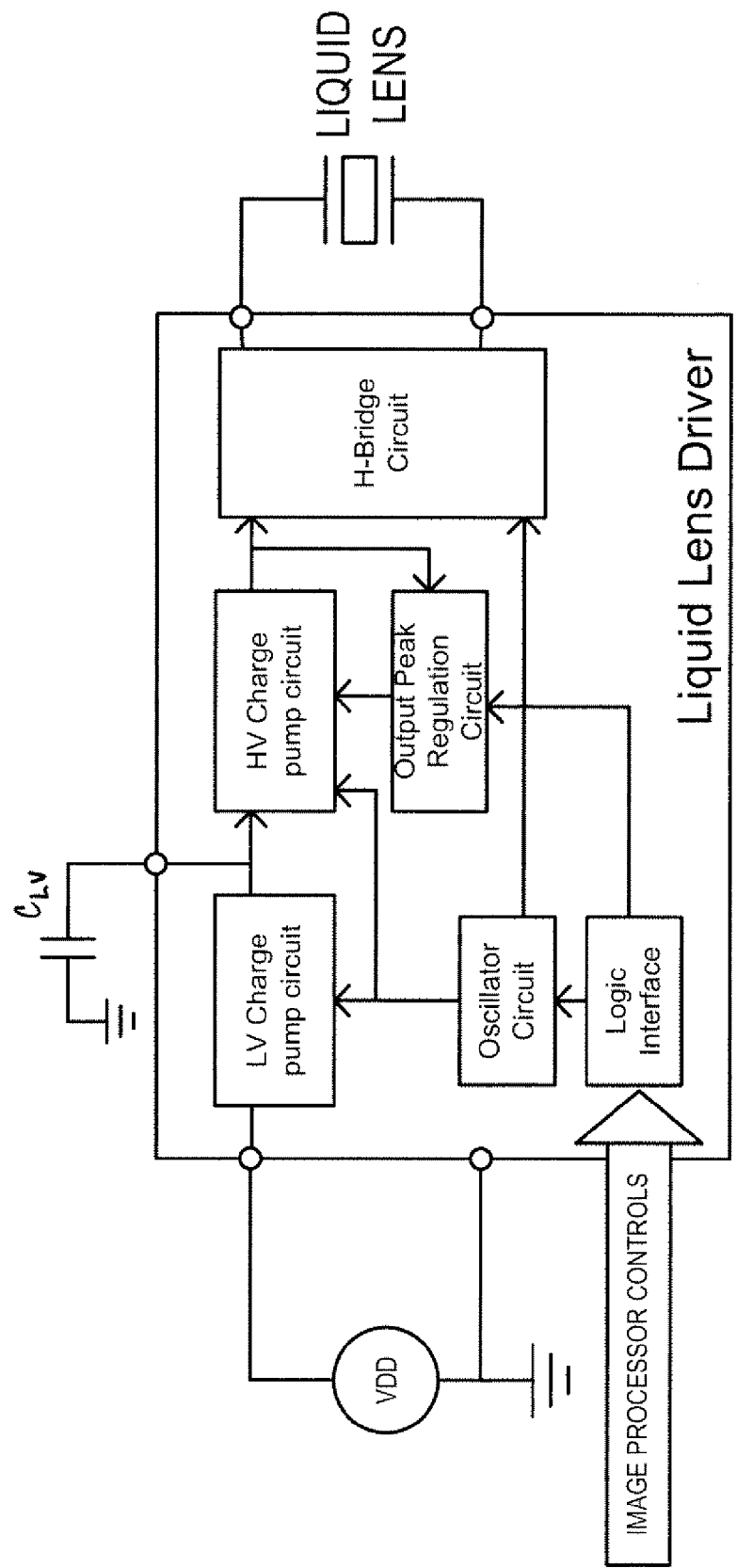
FIG. 1 is a block diagram of a liquid lens driver in accordance with the present invention.

FIG. 1 is a block diagram of a liquid lens driver integrated circuit in accordance with the present invention, connected to a liquid lens device. Liquid lens devices need to operate with a controllable alternating high voltage (for example up to ±50V). The value of the high voltage output controls the focal length of the lens. So an autofocus application can be achieved by changing the value of the liquid lens high voltage driver output according to Image Processor Controls (ISP).

Signals coming from ISP with the desired resolution (for example 8 bits) are processed by a digital Logic Interface (for example I²C) and sent to an Output Peak Regulation Circuit to control the high voltage produced by the HV Charge pump circuit. The alternating voltage on the Liquid Lens (LL in FIG. 2) is generated using an H-Bridge Circuit providing the output of the Liquid Lens Driver. The oscillation frequency of the H-Bridge Circuit can be controlled using the Image Processor Controls through the Logic Interface, or can be fixed according to the Liquid Lens requirements.

Figure 2:
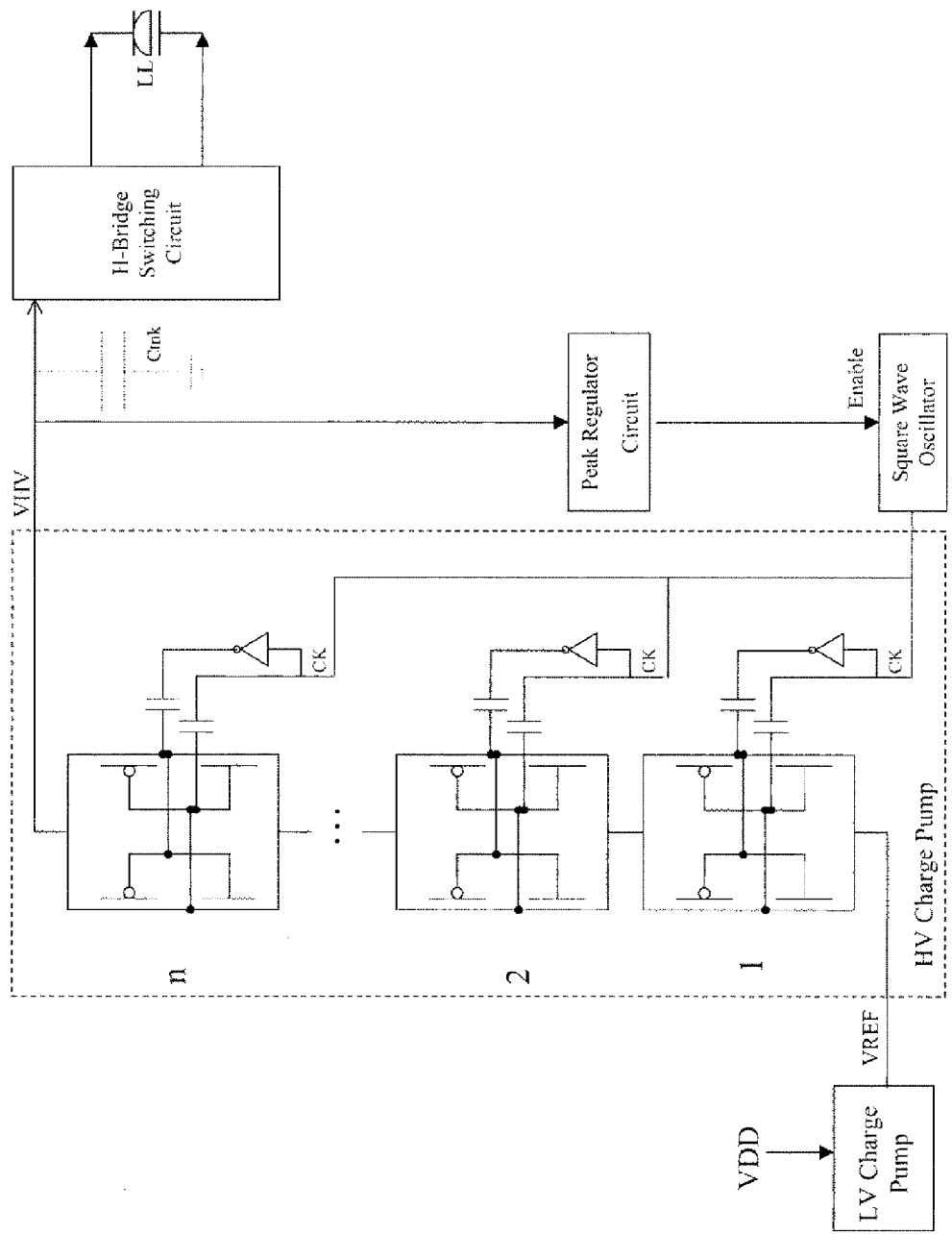
FIG. 2 is a schematic illustration of the charge pump configuration of a preferred embodiment of the present invention.

A charge pump topology may be used to generate the output high voltage (for example 50V) starting from the single low voltage (for example 2.8V) power supply connected to the Liquid Lens Driver circuit. In order to save chip area, the charge pump can be implemented using a cascade of multiple charge pumps as shown in FIG. 2. The optimum choice of the numbers of cascading charge pumps and relative voltage levels depends on the integrated circuit process used. A possible implementation can have a first or low voltage LV Charge Pump to boost the input power supply voltage from 2.8V to 5V, which feeds a second or HV Charge Pump comprising a cascade of individual charge pumps to boost the voltage from 5V to 50V. In essence, the subsequent charge pumps pump between a voltage difference equal to the output of the first charge pump and a circuit ground, not between the power supply and ground. An optional external low voltage capacitor $C_{LV}$ (FIG. 1) may be used to improve the first or low voltage LV Charge Pump performance as shown in FIG. 1.

FIG. 2 schematically illustrates a possible implementation for the HV Charge Pump. A plurality of stages can be cascaded to achieve the high voltage desired. For example, with a VREF of 5V, to achieve a 50V operational capability, at least a number of charge pump stages n>9 must be used. In this particular implementation, shown as an example, each stage consists of 4 MOS transistors (2 N-MOS and 2 P-MOS) and 2 capacitors connected as shown in FIG. 2. In each clock phase, one N-MOS and an opposite P-MOS and one capacitor are working to provide the store and the charge phases necessary for charge pump operation. The high voltage output of the cascaded charge pumps is regulated to the desired level by the Output Peak Regulation Circuit (FIG. 1) labeled Peak Regulator Circuit in FIG. 2.

Figure 3:
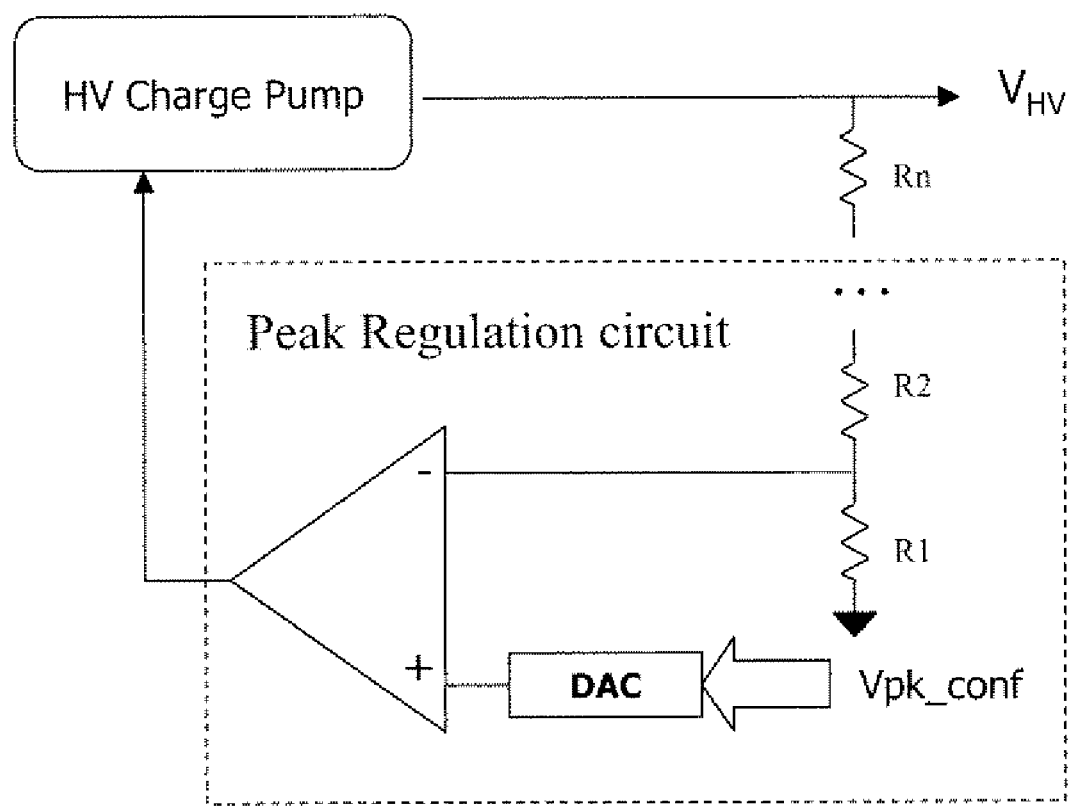
FIG. 3 is a block diagram of an output peak regulation circuit of a preferred embodiment of the present invention.

FIG. 3 shows the details of a possible implementation of the Output Peak Regulation Circuit. The output of the HV Charge Pump VHV is divided by a restive partition (voltage divider) and compared by comparator COMP with a voltage coming from a digital to analog circuit (DAC). The DAC output is controlled by n bits (for example 8 bits) Vpk_conf that come from ISP through the digital Logic Interface. The charge pump control is by switching the charge pump on (enable in FIG. 2) and off in response to the output of the comparator.

Contrary to usual practice, a very small integrated (or none at all) tank or filter capacitor Ctnk (FIG. 2) can be used on high voltage charge pump output. This avoids the need for a large high voltage external component and its pin connection. The liquid lens itself connected to the H-bridge switching circuit is used as the main tank capacitor. So the peak regulation circuit that provides the control of the high voltage charge pump output also provides the control for the LL voltage necessary for auto-focus. The output of the HV Charge Pump is not considered as a high voltage power supply, but actually behaves as the driver for the liquid lens in the charging transitions of the liquid lens, a liquid lens providing a primarily capacitive load on the driver.

Figure 4:
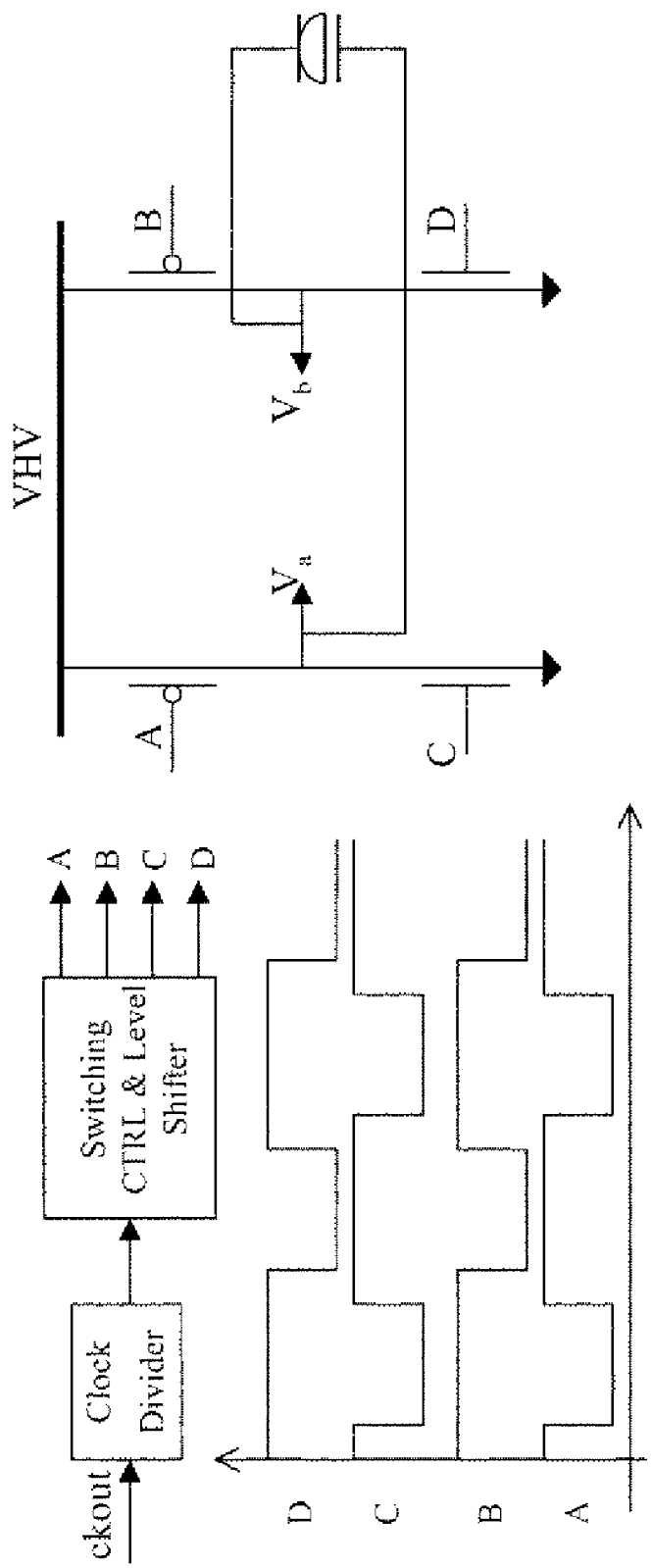
FIG. 4 is a schematic representation of an H-bridge used with a preferred embodiment of the present invention, together with a control waveform diagram therefor.

FIG. 4 shows the details of a possible implementation of H-Bridge Circuit and its switching control signals. The circuit consists of 4 switches (for example 2 NMOS and 2 PMOS) with the relative high voltage level translators to correctly control the switching behavior needed for LL liquid lens operation (focusing). The switching frequency can be obtained by dividing the frequency of the main oscillator used for the charge pump operation by a predetermined factor (or by a factor configured by the Logic Interface). The switching signal waveforms shown provide a common control for devices A and C so that both cannot be on at the same time, and a common control for devices B and D so that they cannot both be on at the same time, thereby avoiding any momentary short circuit to ground. While C and D can be on at the same time, that condition is momentary only, so that the output of the H-bridge has the characteristics of a balanced wave, more specifically the characteristics of an alternating balanced square wave voltage. The phasing is purposely skewed so C and D can be momentarily on at the same time, momentarily coupling both liquid lens inputs to circuit ground, rather than possibly A and B being momentarily on to avoid any buildup of charge that might result from momentarily coupling both liquid lens inputs to the high voltage.

Figure 5:
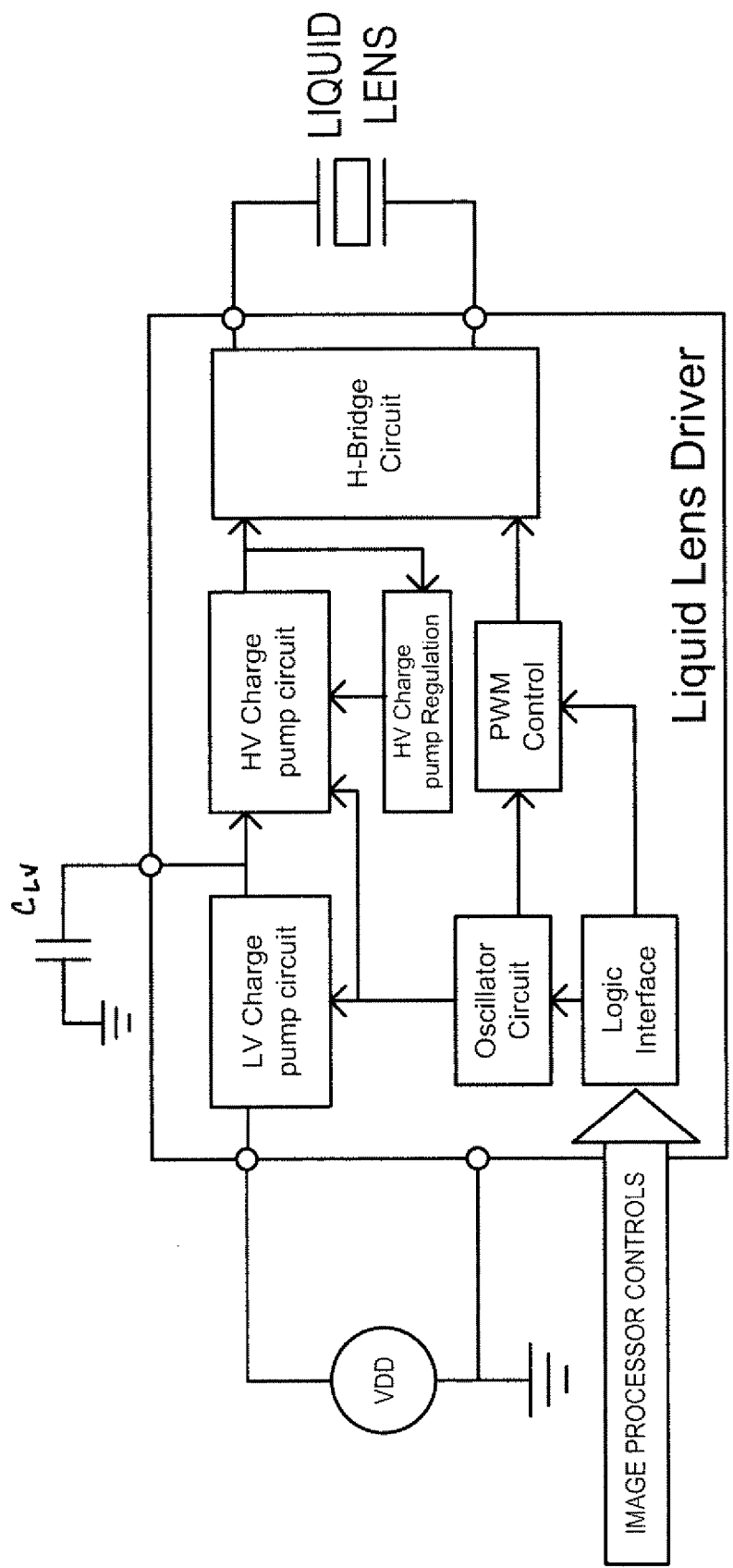
FIG. 5 is a block diagram of an alternate embodiment of liquid lens driver in accordance with the present invention.
Figure 6:
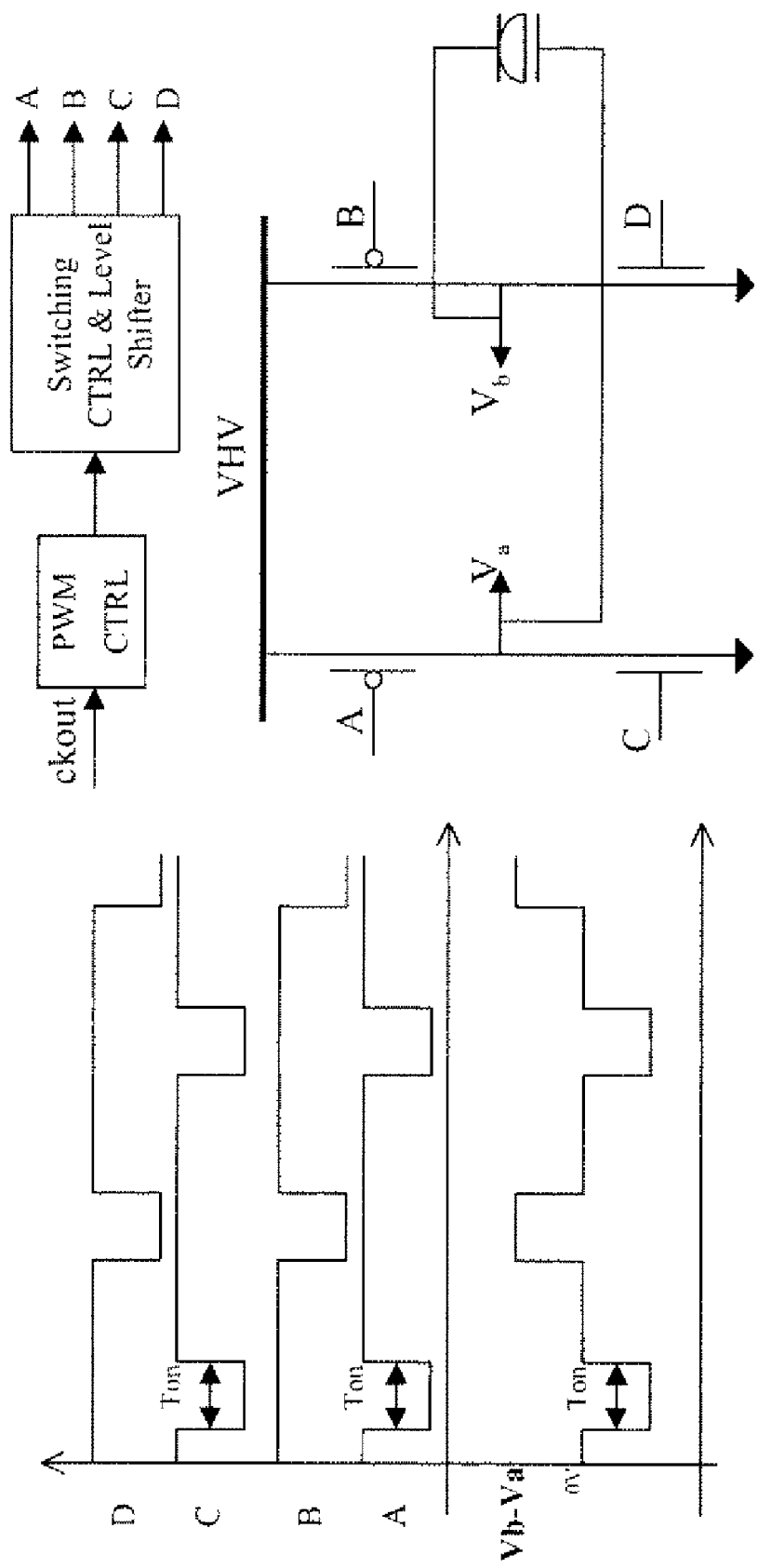
FIG. 6 is a schematic representation of an H-bridge used with the embodiment of FIG. 5, together with a control waveform diagram therefor.

Another embodiment of the present invention is shown in FIGS. 5 and 6. In the prior embodiment, the voltage of the HV Charge Pump Circuit was controlled, so that the H-Bridge Circuit was driven with a fixed waveform of a varying (controlled) voltage. Since a liquid lens is responsive to the RMS voltage applied thereto, in the embodiment of the present invention as shown in FIGS. 5 and 6, pulse width modulation rather than amplitude modulation is used. In such a system as shown in FIG. 5, the HV Charge Pump Regulation circuit would control the HV Charge Pump Circuit to maintain a fixed charge pump output and the PWM Control would be controlled through the Logic Interface by the Image Processor Controls provided thereto. Thus the on-time Ton per oscillator cycle is controlled, as shown in FIG. 6, again providing a balanced waveform about zero for the liquid lens drive voltage Vb–Va, with both transistors C and D being on between pulses to connect both liquid lens connections to circuit ground. It should be noted that like the first embodiment, while Vb–Va swings both positive and negative, both Vb and Va remain positive at all times, so that a negative supply is not needed or used.

In traditional charge pump topologies, an output capacitor is needed in order to store charge. In this case, in order to reduce space on the circuit board and application costs, utilizing the liquid lens itself as a capacitor for a charge reservoir is a unique implementation. So the topology described in this invention does not require the use of high voltage capacitors, inductors or transformers as usually done to provide high voltage outputs.

In this case, without a large external high voltage (discrete) capacitor on the output of the charge pump, the charge pump output resistance is itself the driving impedance for charging the liquid lens capacitance. The H-Bridge acts only as a selector, determining the polarity of the charging. In the case where an external high voltage capacitor Ctnk is connected, it is possible to achieve sharper edges on the output while controlling the slopes internally.

Thus the present invention uses a compact integrated circuit solution for driving liquid lenses in autofocus applications. The invention uses a controllable charge pump topology to produce high voltage and needs only a low voltage external capacitor, no high voltage capacitor or inductor or transformer as usually done in DC boost converter applications. While a specific type of charge pump has been disclosed, it is to be understood that other types of charge pumps or charge pump configurations may be used as desired. In that regard, the phrase "charge pump" is used herein and in the claims that follow in a general sense to designate voltage boosting circuits operative using one or more capacitors without the use of an inductor, and includes, but is not limited to, voltage doublers and voltage multipliers. Also in the embodiment disclosed, a first charge pump is used to approximately double the supply voltage, and then that voltage is used as a reference for each of a plurality of cascaded charge pumps. However other arrangements of a plurality of charge pumps may be used if desired, provided the desired voltage outputs are achieved.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A liquid lens system comprising:
   a liquid lens
   a logic interface for receiving liquid lens focusing signals from an external processor;
   an output peak regulation circuit coupled to the logic interface for receiving the liquid lens focusing signals from the logic interface;
   a controllable charge pump for boosting the voltage of a power supply to the liquid lens focusing voltage responsive to the control of the output peak regulation circuit, the charge pump having a first charge pump and a plurality of cascaded second charge pumps, the first charge pump pumping from a voltage difference between an input power supply and a circuit ground, and the plurality of cascaded second charge pumps pumping between a voltage difference equal to the output of the first charge pump and the circuit ground;
   an oscillator;
   an H-bridge circuit coupled to an output of the controllable charge pump and driven by the oscillator circuit for providing a balanced wave to the liquid lens responsive to the output of the controllable charge pump.

2. The system of claim 1 wherein the driver comprises an integrated circuit.

3. The system of claim 1 wherein the oscillator frequency is a fixed frequency.

4. The system of claim 1 wherein the oscillator frequency is programmable by programming signals received through the logic interface.

5. The system of claim 1 wherein the controllable charge pump is controlled by switching the charge pump on and off.

6. The system of claim 1 wherein the output peak regulation circuit comprises a DAC, a voltage divider and a comparator, wherein the DAC converts a multiple bit liquid lens focusing signal from the logic interface to an analog signal as a first input of the comparator, the voltage divider dividing down the output of the controllable charge pump as a second input to the comparator, the output of the comparator turning the charge pump on and off to maintain an equality between the first and second inputs to the comparator.

7. A liquid lens system comprising:
   a liquid lens
   a logic interface for receiving liquid lens focusing signals from an external processor;
   an output peak regulation circuit coupled to the logic interface for receiving the liquid lens focusing signals from the logic interface;
   a charge pump for boosting the voltage of a power supply to a liquid lens focusing voltage responsive to the control of the output peak regulation circuit, the charge pump having a first charge pump and a plurality of second charge pumps, the first charge pump pumping from a voltage difference between an input power supply and a circuit ground, and the plurality of cascaded second charge pumps pumping between a voltage difference equal to the output of the first charge pump and the circuit ground;
   the output peak regulation circuit having a DAC, a voltage divider and a comparator, wherein the DAC converts a multiple bit liquid lens focusing signal from the logic interface to an analog signal as a first input of/be comparator, the voltage divider dividing down the output of the charge pump as a second input to the voltage divider, the output of the comparator turning the charge pump on and off to maintain an equality between the first and second inputs to the comparator;
   an oscillator;

an H-bridge circuit coupled to an output of the controllable charge pump and driven by the oscillator circuit for providing a balanced wave to the liquid lens responsive to the output of the controllable charge pump.

8. The system of claim 7 wherein the driver comprises an integrated circuit.

9. The system of claim 7 wherein the oscillator frequency is a fixed frequency.

10. The system of claim 7 wherein the oscillator frequency is programmable by programming signals received through the logic interface.

11. A method of driving a liquid lens comprising:
providing a plurality of charge pumps, a first charge pump operating between the voltage source and the circuit ground, the rest of the plurality of charge pumps being cascaded and operating with a voltage difference equal to the voltage difference between an output of the first charge pump and the circuit ground
controlling the charge pump through a digital interface to provide a controlled charge pump output voltage;
coupling the charge pump output to an H-bridge without a discrete high voltage capacitor coupled to the charge pump output;
coupling an output of the H-bridge to a liquid lens; and,
driving the H-bridge with an oscillator to provide an alternating balanced voltage to the liquid lens;
providing digital liquid lens focusing signals to the digital interface to focus the liquid lens responsive to the focusing signals.

12. The method of claim 11 wherein controlling the charge pump through a digital interface to provide a controlled charge pump output voltage comprises coupling the digital interface to a DAC, dividing down the charge pump output and comparing it with an output of the DAC, and using the result of the comparison to turn the charge pump on and off.

13. A driver for a liquid lens comprising:
a logic interface for receiving liquid lens focusing signals from an external processor;
a pulse width modulation circuit coupled to the logic interface for receiving the liquid lens focusing signals from the logic interface;
a charge pump for boosting the voltage of a power supply to a liquid lens focusing voltage, the charge pump having a first charge pump and a plurality of cascaded second charge pumps, the first charge pump pumping from a voltage difference between an input power supply and a circuit ground, and the plurality of cascaded second charge pumps pumping between a voltage difference equal to the output of the first charge pump and the circuit ground;
an oscillator coupled to the pulse width modulation circuit;
an H-bridge circuit coupled to an output of the charge pump and driven by an output of the pulse width modulation circuit for providing a balanced wave to a liquid lens responsive to the output of the pulse width modulation circuit.

14. The driver of claim 13 wherein the driver comprises an integrated circuit.

15. The driver of claim 13 wherein the oscillator frequency is a fixed frequency.

16. The driver of claim 13 wherein the oscillator frequency is programmable by programming signals received through the logic interface.

17. The driver of claim 13 wherein the balanced wave connects the liquid lens to ground between pulses.

\* \* \* \* \*